United States Patent [19]
Fuhrman et al.

[11] Patent Number: 6,152,127
[45] Date of Patent: Nov. 28, 2000

[54] CUTTING APPARATUS AND METHOD FOR CUTTING AND ROUTING

[75] Inventors: Michael D. Fuhrman; Dana E. Fuhrman, both of Bothell, Wash.

[73] Assignee: Carver Saw Co., Bothell, Wash.

[21] Appl. No.: 09/344,830

[22] Filed: Jun. 25, 1999

[51] Int. Cl.⁷ ................................................ B28D 7/04
[52] U.S. Cl. ........................................ 125/35; 125/13.01
[58] Field of Search .................................. 83/432, 435.1, 83/477, 468.3, 522.18; 451/296, 350, 354, 64, 340, 361, 415, 411, 425, 426, 420, 421, 423; 125/35, 12, 13.01, 23.02, 16.01

[56] References Cited

U.S. PATENT DOCUMENTS

| | | | |
|---|---|---|---|
| 2,455,113 | 11/1948 | Coates | 125/13 |
| 2,486,386 | 11/1949 | Bingaman | 51/241 |
| 2,705,005 | 3/1955 | Tuorto | 125/14 |
| 2,863,441 | 12/1958 | Harclerode | 125/13 |
| 2,998,813 | 9/1961 | Wilson | 125/13 |
| 3,621,829 | 11/1971 | Maluck | 125/13 R |
| 3,635,206 | 1/1972 | Harclerode | 125/13 |
| 3,807,095 | 4/1974 | Harding et al. | 125/13 SS |
| 3,815,570 | 6/1974 | Story | 125/14 |
| 4,428,159 | 1/1984 | Sigetich et al. | 51/92 R |
| 4,940,038 | 7/1990 | O'Keefe | 125/13.01 |
| 4,991,354 | 2/1991 | Schweickhardt | 51/78 |
| 5,282,408 | 2/1994 | Shiotani et al. | 83/432 |
| 5,394,781 | 3/1995 | Tsubai | 83/449 |
| 5,482,026 | 1/1996 | Russell | 125/12 |
| 5,664,612 | 9/1997 | Klemma | 144/286.1 |
| 5,746,193 | 5/1998 | Swan | 125/13.03 |
| 5,772,496 | 6/1998 | Kurtz et al. | 451/354 |
| 5,882,155 | 3/1999 | Testa, Jr. | 409/132 |

OTHER PUBLICATIONS

MK Diamond Products, Inc., Tile and Stone Catalog, 1996, p. 13.

National Tile Contractors Association, Tile Letter, Mar., 1999, p. 61.

*Primary Examiner*—Derris H. Banks
*Attorney, Agent, or Firm*—Graybeal Jackson Haley LLP

[57] ABSTRACT

A frame assembly for a cutting apparatus includes a frame and a saw-motor mounting structure that is removably attachable to the frame. Therefore, a craftsperson can break down the frame assembly to allow easy transport of the cutting apparatus. Another apparatus includes a frame, motorized tool, item tray, and coolant pan. The frame has a coolant-pan slot, and the motorized tool is attachable to the frame. The item tray is movably mounted to the frame, and the coolant pan is slidably mounted within the coolant-pan slot. Therefore, a craftsperson can adjust the position of the coolant pan to catch coolant that dribbles off the item in the item tray. In addition, a cutting/routing apparatus includes a frame, a saw-motor mounting structure, a saw, a router mounting structure, a router, and a cutting/routing tray. The saw-motor mounting structure is attachable to the frame, and the saw is mountable to the saw-motor mounting structure. Likewise, the router mounting structure is attachable to the frame, and the router is mountable to the router mounting structure. The cutting/routing tray is movably mounted to the frame. Therefore, such an apparatus allows a craftsperson to cut and rout tiles on site with a single machine.

22 Claims, 4 Drawing Sheets

CUTTING APPARATUS AND METHOD FOR CUTTING AND ROUTING

TECHNICAL FIELD

This invention pertains generally to power tools and more particularly to an improved cutting tool such as a tile saw and a method for cutting and routing an item such as a tile.

BACKGROUND

Portable power saws such as tile saws are frequently used by craftspeople to cut building materials such as tiles and stone into different shapes and sizes for various applications. For example, craftspeople working on construction and remodeling projects often use tile saws to cut tiles and stone for floors, walls, countertops, and fireplaces. Because on-site tile cutting saves time and money as compared with off-site cutting, many tile saws are portable so that craftspeople can use them at the work site.

FIG. 1 is a perspective view of a portable tile saw 10, which includes a frame 12, tile-tray guide rails 14, a tile-cutting tray 16, a coolant pan 18, a saw motor 20, and saw blade 22. Because tiles are typically made from ceramic or stone, the saw blade 22 is often diamond tipped. The tile saw 10 is shown cutting a tile 24.

Unfortunately, many portable tile saws are heavy and bulky, and thus are difficult for a lone craftsperson to transport around the work site. For example, a craftsperson often carries his/her portable tile saw up and down stairs. But the tile saw's weight—typically anywhere from 70 to 120 lbs—and structural layout make it difficult to carry even for a relatively strong person. Therefore, many craftspeople seek assistance when carrying their tile saws, particularly when carrying them up and down stairs. But if assistance is unavailable, a craftsperson either waits for assistance to arrive or carries the saw by himself/herself. Unfortunately, waiting for assistance can delay the job and thus cause the craftsperson to lose revenue, and carrying the saw alone can cause the craftsperson to injure himself/herself or to drop and damage the saw.

Referring again to FIG. 1, another problem with many portable tile saws is that the blade coolant leaks onto the floor or other saw-support surface. For example, a pump (not shown in FIG. 1) circulates a coolant such as water from the coolant pan 18 to the saw blade 22, and ideally, the coolant flows back into the pan 18. The pan 18, however, is in a fixed position and is only about as wide as the frame 12. Therefore, if a craftsperson cuts a relatively wide tile, the tile may extend past the edge of the frame 12, and thus past the edge of the pan 18. Consequently, the coolant that dribbles from the blade 22 onto the tile surface may roll off the edge of the tile and onto the floor instead of back into the pan 18.

Still referring to FIG. 1, yet another problem with all portable tile saws is the lack of a routing attachment. Frequently, after cutting the tile 24, a craftsperson smoothens and/or shapes the corners and edges of the tile before installing it. To do this, the craftsperson typically uses a separate routing tool or sends the tile 24 out to a routing facility. Unfortunately, routing tools are relatively expensive, and sending tiles out to a routing facility often delays the completion of the project.

SUMMARY OF THE INVENTION

In one aspect of the invention, a frame assembly for a cutting apparatus includes a frame and a saw-motor mounting structure that is removably attachable to the frame. Therefore, a craftsperson can quickly break down the frame assembly to allow easy transport of the cutting apparatus.

In another aspect of the invention, an apparatus includes a frame, motorized tool, material tray, and coolant pan. The frame has a coolant-pan slot, and the motorized tool is attachable to the frame. The material tray is movably mounted to the frame, and the coolant pan is slidably mounted within the coolant-pan slot. Therefore, a craftsperson can adjust the position of the coolant pan to catch coolant that dribbles off the material in the material tray.

In yet another aspect of the invention, a cutting/routing apparatus includes a frame, a saw-motor mounting structure, a saw, a router mounting structure, a router, and a cutting/routing tray. The saw-motor mounting structure is attachable to the frame, and the saw is mountable to the saw-motor mounting structure. Likewise, the router mounting structure is attachable to the frame, and the router is mountable to the router mounting structure. The cutting/routing tray is movably mounted to the frame. Therefore, such an apparatus allows a craftsperson to cut and rout tiles on site with a single machine.

DETAILED DESCRIPTION OF THE INVENTION

Figure 2:
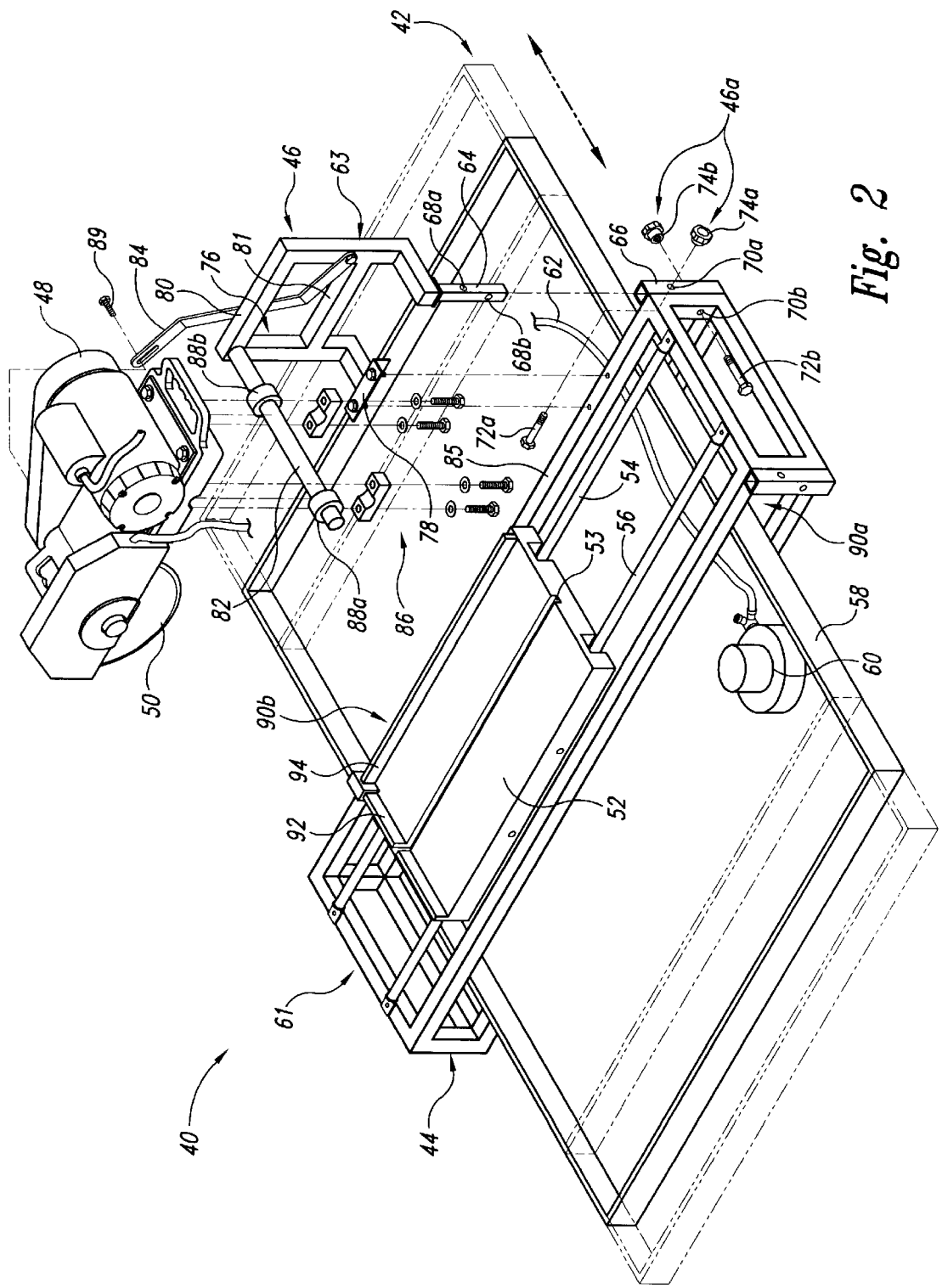
FIG. 2 is a perspective view of a tile saw having a removable saw-mounting structure according to an embodiment of the invention.

FIG. 2 is a perspective view of a tile saw 40 having a saw-frame assembly 42, which includes a frame 44 and a removable saw-motor mounting structure 46 according to an embodiment of the invention. The tile saw 40 also includes a saw motor 48 mounted to the structure 46, a saw blade 50, a cutting tray 52 having a cutting channel 53, cutting-tray guide rails 54 and 56, a coolant pan 58, a coolant pump 60, and a coolant hose 62.

The removable saw-motor mounting structure 46 allows for easier carrying of the saw 40 as compared to prior saws. For example, a craftsperson (not shown) can remove the structure 46 and the attached motor 48 from the frame 44. Typically, the motor 48 has a handle 59, and the tubular construction of the frame 44 makes it easy for the craftsperson to grasp. Therefore, the craftsperson can put the cutting tray 52 inside the coolant tray 58, carry the motor 48 and attached support 46 in one hand, and carry an end 61 of the frame 44 in the other hand such that the coolant pan 58 and its contents do not fall away from the frame. Or, to reduce the weight being carried at any one time, the craftsperson can carry the motor 48 and the attached structure 46 to the destination, and then come back for the frame 44, the coolant pan 58, the cutting tray 52, and the other components of the saw 40.

Still referring to FIG. 2, in one embodiment the saw-motor mounting structure 46 includes a first support member 63 and an insert 64, which is attached to the support member 63 and which mates with a receptacle 66 of the frame 44. In one embodiment, the receptacle 66 is a hollow aluminum tube having a rectangular cross section. The insert 64 and receptacle 66 include aligned holes 68a and 68b and 70a and 70b, respectively, and fasteners such as bolts 72a and 72b are disposed within these holes to secure the structure 46 to the frame 44. The holes 68a, 68b, 70a, and 70b may be threaded, or fastening nuts such as thumb screws 74a and 74b may hold the bolts 72a and 72b in place. The thumb screws 74a and 74b promote quick hand attachment and removal of the structure 46 to and from the frame 44.

The structure 46 also includes a second support member 76, a mount 78 attached to the member 76, cross-support members 80 and 81, a saw-holding bar 82, and a saw-stabilization bracket 84 according to an embodiment of the invention. To promote quick hand attachment and removal of the structure 46 to and from the frame 44, the mount 78 may be attachable to a cross element 85 of the frame 44 with bolts and thumb screws (not shown) that are similar to the bolts 72a and 72b and thumb screws 74a and 74b. The bar 82 is a cylindrically shaped solid-steel rod, and the saw motor 48 is attached thereto with a conventional bracket-and-bolt mounting assembly 86, which allows the craftsperson to adjust the height of the saw blade 50 by rotating the motor 48 about the bar 82. Donut washers 88a and 88b prevent side-to-side movement of the motor 48 so that the saw blade 50 stays aligned with a cutting channel 53. The washers 88a and 88b may be welded to the bar 82 or may be secured to the bar with set screws (not shown). The set screws are useful where the cutting tray 52 has multiple cutting channels 53 (only one shown in FIG. 2) because it allows the craftsperson to align the saw blade 50 with the desired channel. Furthermore, unlike prior tile saws, the craftsperson can adjust the position of the saw motor 48 along the bar 82 while the saw-motor mounting structure 46 is unattached to the frame 44. In such an embodiment, the bar 82 may have an alignment mark (not shown) that the craftsman can use to align the blade 50 to the cutting channel 53 while the support 46 is not attached to the frame 44. The bracket 84 provides added support to the motor 48. One end of the bracket 84 attaches to the support member 63, and the other end attaches to the motor 48 with a fastener 89 and is slotted to allow the motor 48 to be rotated about the bar 82.

In one embodiment, the components of the saw-motor mounting structure 46 have the following dimensions (outside dimensions are given where applicable). The support members 63 and 76 are L shaped, have horizontal sections that are approximately 5" long, vertical sections that are approximately 6.75" high, and have 1.5"×1.5" cross sections. The insert 64 is approximately 6.75" high and has a 1.125"×1.125" cross section. The mount 78 is made from 0.25"-thick steel and is approximately 6.25" long, 1.75" wide, and 1.75" deep. The cross-support members 80 and 81 are approximately 8.75" long, and member 80 has a 1.5"×1.5" cross section. The bar 82 is approximately 16.5" long and has a diameter of approximately 0.25" diameter.

Figure 1:
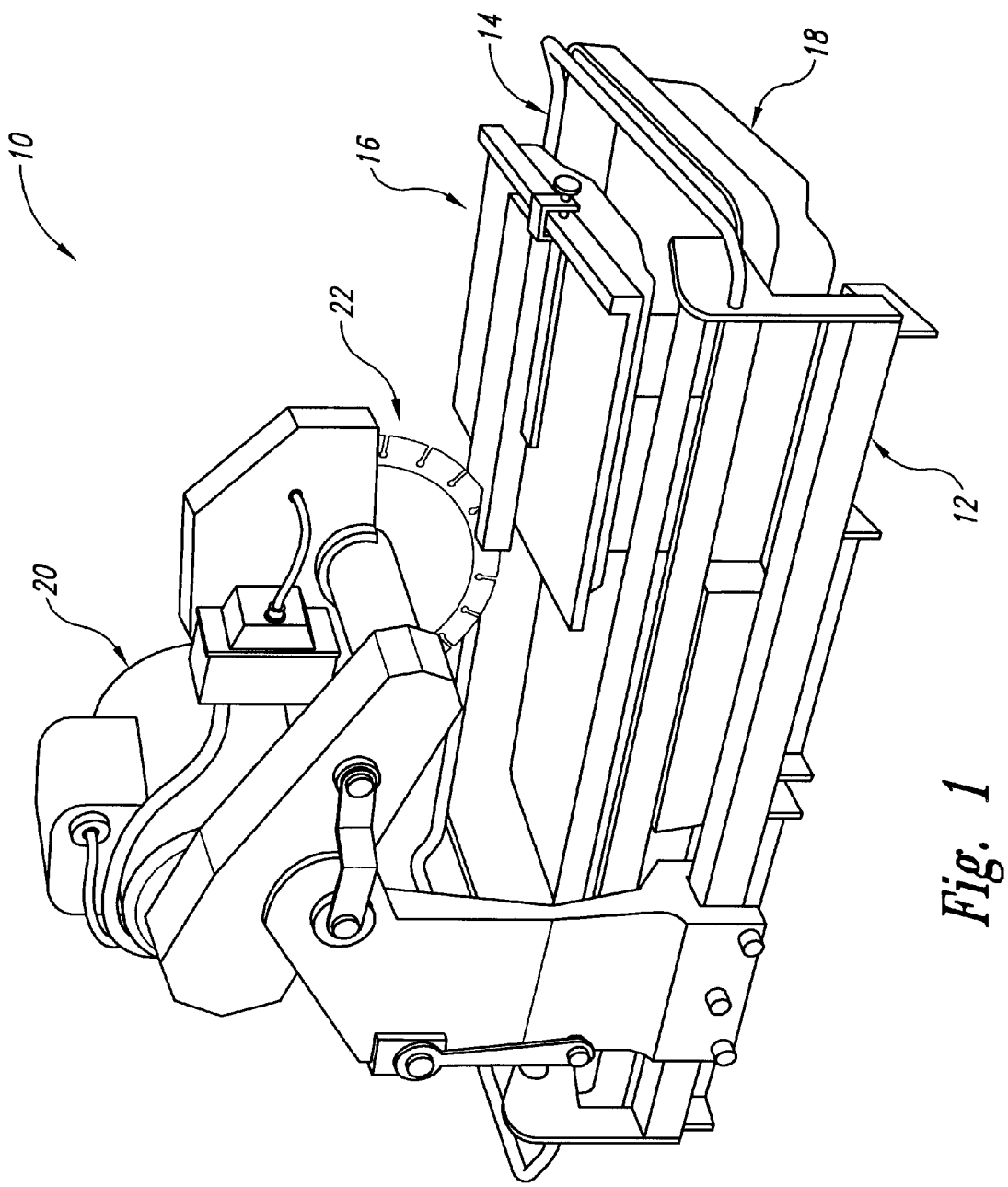
FIG. 1 is a perspective view of a tile saw according to the prior art.

Still referring to FIG. 2, the coolant pan 58 is better able to catch dripping coolant than conventional coolant pans. The pan 58 holds a coolant such as water, which the pump 60 pumps through the hose 62 to cool the saw blade 50, and recovers the coolant that drips from the tile (FIG. 1) being cut. In one embodiment, the coolant pan 58 is disposed and can slide within a slot formed by side openings 90a and 90b of the frame 44. Thus, the craftsman can adjust the position of the pan 58 so that it can catch coolant dripping from both wide and narrow tiles. The pan 58 is also wider than conventional coolant pans, and this further increases the pan's positional range.

Still referring to FIG. 2, additional features of the tile saw 40 are discussed. In one embodiment, the frame 44 is rectangular and is formed from welded aluminum tubes having rectangular or square cross sections. A large version of the frame 44 is approximately 39" long by 20" wide by 6¾" high. When including this large frame, the tile saw 40 allows a craftsman to cut tiles having widths up to approximately 24". However, the tile saw 40 can include frames 44 of different sizes. In another embodiment, the coolant pan 58 is 40" wide, and thus is wider than the length of the frame 44. Therefore, the frame 44 fits inside the coolant pan 58 along with the other parts of the saw 40—e.g., the mounting support 46, motor 48, and blade 50—for convenient storage. In still another embodiment, conventional positioning rails 92 and 94 are attached to the cutting tray 52 to hold a tile in place while being cut. In yet another embodiment, the cutting tray 52 has multiple cutting channels 53.

Still referring to FIG. 2, in operation, the craftsperson attaches the saw blade 50 to the motor 48, attaches the motor 48 to the saw-motor mounting structure 46, and attaches the structure 46 to the frame 44. He/she then measures a tile (FIG. 1) and marks where the cut is to be made. Next, the craftsperson places the tile on the cutting tray 52 and adjusts the positioning guides 92 and 94 so that the cut mark is aligned with the saw blade 50. He/she then positions the cooling pan 58 so that it is under both side edges of the tile. This insures that the pan 58 will catch coolant dripping from either side of the tile. Next, the craftsperson starts the motor 48, pushes the tray 52, and thus the tile, toward and into the blade 50, and continues pushing until the tile is cut. He/she then turns off the motor 48.

Figure 3:
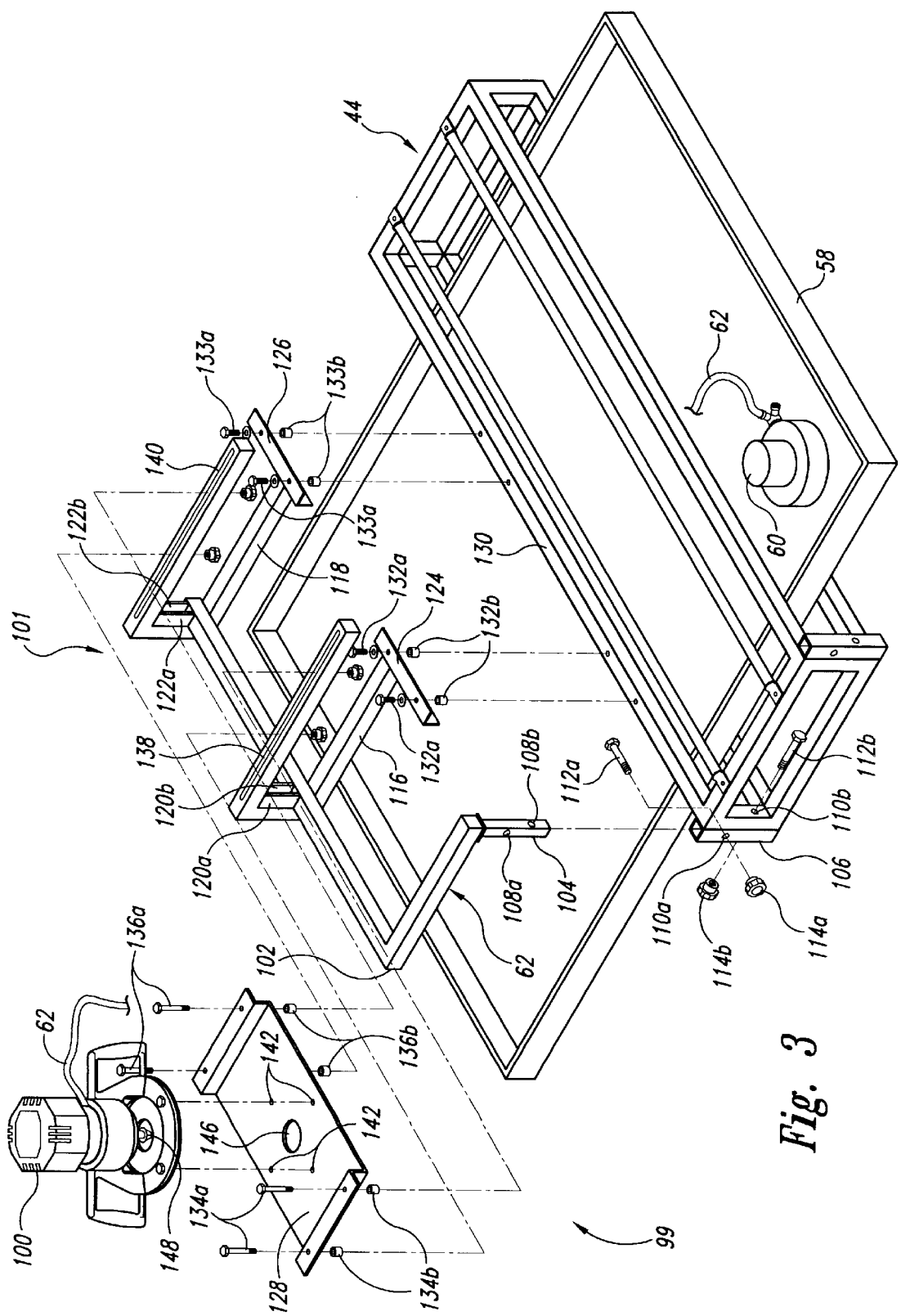
FIG. 3 is a perspective view of the tile-saw frame and coolant pan of FIG. 2 and a removable routing assembly according to an embodiment of the invention.

FIG. 3 is a perspective view of the frame 44 and the coolant pan 58 of the tile saw 40 of FIG. 2, and a removable router assembly 99 according to an embodiment of the invention. The assembly 99 includes a conventional router 100 and a router mounting structure 101, which allows a craftsperson to route the edge of a cut tile using the tile saw 40. Furthermore, because the saw-motor mounting and router mounting structures 46 (FIG. 2) and 101 are relatively easy to attach to and remove from the frame 44, the craftsperson can easily switch back and forth between tile cutting and tile routing. This saves the craftsman time and money as compared with using a separate routing tool or sending the tile out to be routed.

In one embodiment, the router mounting structure 101 includes a cross-support member 102 and an insert 104, which is attached to the member 102 and which mates with a receptacle 106 of the frame 44. The insert 104 and receptacle 106 may be similar to the insert 64 and receptacle 66 of FIG. 2, and include aligned holes 108a and 108b and 110a and 110b, respectively. Fasteners such as bolts 112a and 112b are disposed within these holes to secure the structure 101 to the frame 44. The holes 108a, 108b, 110a, and 110b may be threaded, or fastening nuts such as thumb screws 114a and 114b may hold the bolts 112a and 112b in place. The thumb screws 114a and 114b promote quick hand attachment and removal of the structure 101 to and from the frame 44.

In one embodiment, the router mounting structure 101 also includes first and second support members 116 and 118, corner support brackets 120a and 120b and 122a and 122b, mounts 124 and 126, and a router mounting plate 128. To promote quick hand attachment and removal of the structure 101 to and from the frame 44, the mounts 122 and 124 are attachable to a cross element 130 of the frame 44 with bolts and thumb screws 132a and 132b and 133a and 133b. In addition, the plate 128 is attachable to the support members 116 and 118 with bolts and thumb screws 134a and 134b and 136a and 136b. Furthermore, to allow lateral movement and positioning of the plate 128, the members 116 and 118 include respective bolt slots 138 and 140. The plate 128 includes router mounting holes 142, which receive bolts (not shown) for mounting the router 100 to the plate 128. These bolts may be secured with thumb screws (not shown) to promote quick hand attachment and removal of the router 100 from the plate 128. The plate 128 also includes a bit opening 146 through which a router bit 148 extends. The router 100 or the structure 101 may include a mechanism (not shown) that allows the craftsperson to adjust the distance that the bit 148 extends through the opening 146.

In one embodiment, the components of the router mounting structure 101 have the following dimensions (outside dimensions are given where applicable). The cross-support member 102 is approximately 11.5" wide by 26.25" long. The insert 104 is approximately 6.75" high and has a cross section of approximately 1.125"×1.125". The support members 116 and 118 are approximately 6.75" high, 12.75" wide along the bottom portions, and 15.625" wide along the slotted top portions. The slots 138 and 140 are approximately 11.625" long by 0.625" wide. The support member 116 is approximately 9.75" from the insert 104, and the support member 118 is approximately 12" from the member 116. The mounts 124 and 126 are made from 0.25"-thick steel and are approximately 6.25" long, 1.75" wide, and 1.75" deep. The supports 120a, 120b, 122a, 122b are each made from 0.125"-thick steel and are approximately 2.25" high by 1.5" wide. The plate 128 is formed from 0.25"-thick steel, is approximately 14.94" long by 8" wide, has vertical flange sections that are approximately 1.75" high, and has horizontal flange sections that are approximately 1.75" wide.

Still referring to FIG. 3, in operation, the craftsperson attaches the router 100 to the plate 128, attaches the plate 128 to the router mounting structure 101, and attaches the structure 101 to the frame 44. He/she then adjusts the router bit 148 to the desired depth. Next, the craftsperson places a tile (FIG. 1) on the cutting tray 52 (FIG. 2) and adjusts the positioning guides 92 and 94 (FIG. 2) so that the edge of the tile to be routed is in the desired position with respect to the router bit 148. He/she then positions the cooling pan 58 so that it is under both side edges of the tile. This insures that the pan 58 will catch coolant dripping from either side of the tile. Next, the craftsperson starts the router 100, pushes the tray 52, and thus the tile, and continues pushing until the tile edge is shaped by the bit 148. He/she then turns off the router 100.

In operation, when the craftsperson wishes to cut a tile and then route an edge of the tile, he first attaches the saw-motor mounting structure 46 to the frame 44 as described above in conjunction with FIG. 2. He/she then cuts the tile as described above. Next, the craftsperson attaches the router mounting structure 101 to the frame 44. If he/she would like more room to work, then he/she can remove the saw-mounting structure 46 before routing the tile. Then, the craftsperson routes an edge of the tile as described above.

Figure 4:
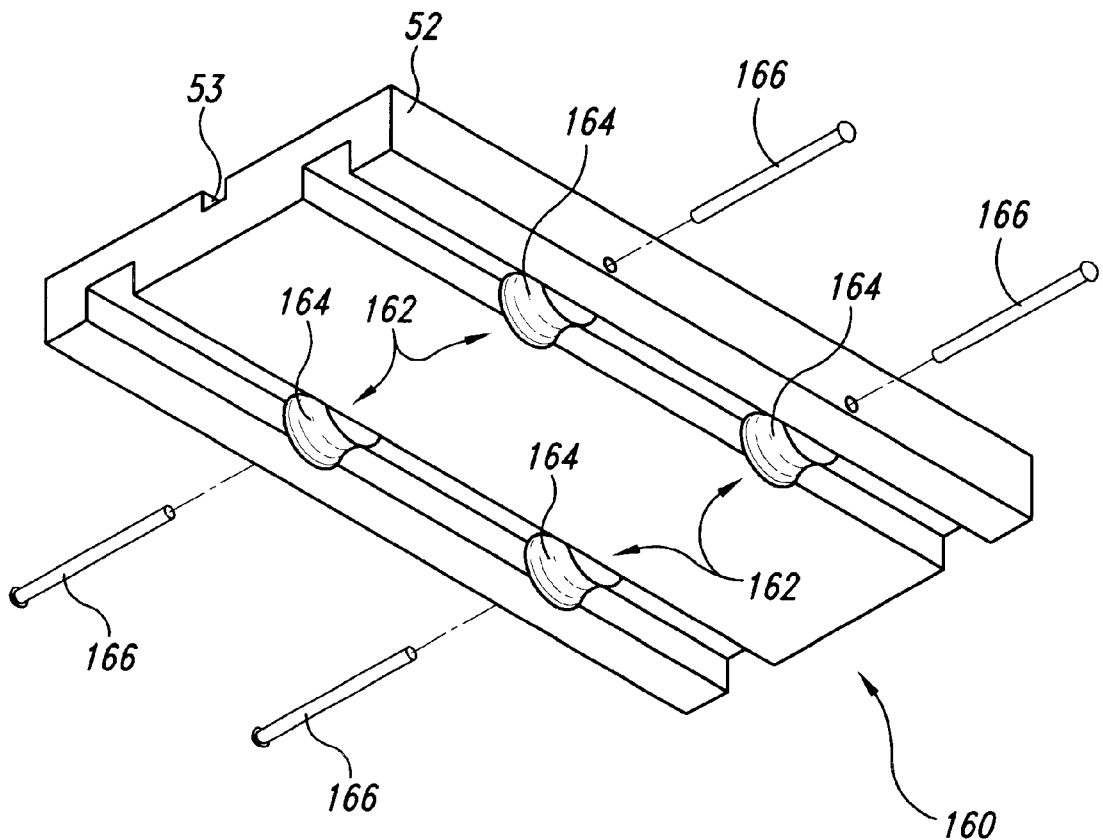
FIG. 4 is a perspective view of the underside of the tile tray of FIG. 2 and the tile-tray wheel assembly according to an embodiment of the invention.

FIG. 4 is a perspective view of the underside of the cutting tray 52 of FIG. 2 and a tray wheel assembly 160 according to an embodiment of the invention. The assembly 160 includes four wheels 162, which have respective U grooves 164 and respective center bearings (not shown). Axles 166 extend through the respective bearings and secure the wheels 162 to the tray 52. The grooves 164 have semi-circular cross sections with approximately the same radii as the respective tray guide rails 54 and 56 (FIG. 2). The shape of the grooves 164 and the relatively close fit between the grooves 164 and the guide rails 54 and 56 ensure that the wheels 162 will roll smoothly even if small particles of dust or other debris adhere to the guide rails. Consequently, there will be few, if any, jitter-induced nicks in the tile being cut or routed. The shapes of the grooves 164 allows the wheels 162 to provide a lateral counterforce and lateral stability sufficient to oppose the lateral force imparted to the tile by the router bit 148 during the routing of the tile.

What is claimed is:

1. An apparatus, comprising:
    a frame having a hollow receptacle;
    a saw-motor mounting structure having an insert that is disposable within the hollow receptacle to facilitate attaching and removing the saw-motor mounting structure to and from the frame;
    a saw-motor that is mounted to the saw-motor mounting structure; and
    a material tray slidably mountable to the frame.

2. The apparatus of claim 1, further comprising:
    guide rails attached to the frame; and
    wheels attached to the material tray, the wheels being operable to ride on the guide rails.

3. The apparatus of claim 1, further comprising:
    cylindrical guide rods attached to the frame; and
    U-groove wheels attached to the material tray, the wheels being operable to ride on the guide rails.

4. A cutting apparatus, comprising:
    a frame having a frame slot;
    a motorized cutting tool that is attached to the frame;
    a material tray mounted to the frame and moveable in a cutting direction; and
    a coolant pan disposed within the frame slot and moveable in a direction that is perpendicular to the cutting direction.

5. The apparatus of claim 4 wherein:
    the frame has a frame length that is greater than the frame width, the frame length being parallel to the cutting direction;
    the coolant pan has a width that is greater than the frame length; and
    the coolant pan is oriented within the frame slot such that the width of the coolant pan is perpendicular to the cutting direction.

6. The apparatus of claim 4 wherein the motorized tool comprises a motor and an attached saw blade.

7. The apparatus of claim 4 wherein the power tool comprises a router.

8. A cutting apparatus, comprising:
    a frame having a saw-mounting portion and a router-mounting portion that is separate from the saw-mounting portion;
    a saw-motor mounting structure that is attachable to the saw-mounting portion of the frame;
    a saw motor that is mountable to the saw-motor mounting structure;
    a router mounting structure that is attachable to the router-mounting portion of the frame;
    a router that is mountable to the router mounting structure; and
    a material tray mounted to the frame and moveable in a cutting direction.

9. The apparatus of claim 8 wherein the saw-motor mounting and router mounting structures are removably attachable to the frame.

10. The apparatus of claim 8 wherein:
the router-mounting portion of the frame comprises a hollow receptacle; and
the router mounting structure comprises an insert that is disposable within the hollow receptacle.

11. The apparatus of claim 8 wherein:
the router-mounting portion of the frame comprises:
  a hollow receptacle; and
  a frame element; and
the router mounting structure comprises:
  an insert that as disposable within the hollow receptacle; and
  a support element that is removably attachable to the frame element.

12. The apparatus of claim 8 wherein:
the router-mounting portion of the frame comprises:
  a hollow receptacle; and
  a frame element; and
the router mounting structure comprises:
  an insert that is disposable within the hollow receptacle;
  a pair of support elements that are removably attachable to the frame element, each support element having a respective slotted section; and
  a mounting plate attachable to the slotted sections of the support elements.

13. The cutting apparatus of claim 8 wherein:
the saw-mounting portion of the frame comprises a hollow saw receptacle;
the saw-motor mounting structure comprises an insert that is disposable within the hollow saw receptacle;
the router-mounting portion of the frame comprises a hollow router receptacle; and
the routing mounting structure comprises an insert that is disposable within the hollow router receptacle.

14. A method, comprising:
placing an item on a cutting tray that is disposed on a frame of a cutting apparatus;
moving the cutting tray in a cutting direction to cut the item with a motorized tool that is attached to the frame;
applying a coolant from a coolant pan to the motorized tool, the coolant pan being disposed within a coolant-pan opening of the frame; and
moving the coolant pan within the coolant-pan opening in a direction perpendicular to the cutting direction to catch the applied coolant as it drips from the item.

15. The method of claim 14 wherein the motorized tool comprises a saw.

16. The method of claim 14 wherein the shaping tool comprises a router.

17. The method of claim 14 wherein the coolant comprises water.

18. A method, comprising:
attaching a saw-motor mounting structure to a saw-mounting portion of a frame of a cutting apparatus;
cutting an item with a saw blade moved by a saw motor that is mounted to the saw-motor mounting structure, the item having an edge;
attaching a router mounting structure to a router-mounting portion of the frame of the cutting apparatus, the router-mounting portion of the frame being spaced apart from the saw-mounting portion of the frame; and
cutting the edge of the item with a router that is mounted to the router mounting structure.

19. The method of claim 18, further comprising:
detaching the saw-motor mounting structure from the saw-mounting portion of the frame after cutting the item with the saw blade; and
detaching the router mounting structure from the router-mounting portion of the frame after cutting the edge of the item with the router.

20. A cutting apparatus, comprising:
a frame;
a material tray disposed on the frame and movable in a cutting direction; and
a coolant pan disposed beneath the material tray and wider than the material tray in a direction perpendicular to the cutting direction.

21. The cutting apparatus of claim 20 wherein:
the frame has a coolant-pan slot; and
the coolant pan is disposed within the coolant-pan slot.

22. The cutting apparatus of claim 20 wherein the coolant pan is wider than the frame in a direction perpendicular to the cutting direction.

* * * * *